US011549516B2

(12) United States Patent
Kasatani et al.

(10) Patent No.: US 11,549,516 B2
(45) Date of Patent: Jan. 10, 2023

(54) SEALING SYSTEM, AND PUMP SYSTEM INCLUDING THE SEALING SYSTEM

(71) Applicant: Ebara Corporation, Tokyo (JP)

(72) Inventors: Tetsuji Kasatani, Tokyo (JP); Shuichiro Honda, Tokyo (JP)

(73) Assignee: Ebara Corporation, Tokyo (JP)

( * ) Notice: Subject to any disclaimer, the term of this patent is extended or adjusted under 35 U.S.C. 154(b) by 11 days.

(21) Appl. No.: 17/260,771

(22) PCT Filed: Jul. 19, 2019

(86) PCT No.: PCT/JP2019/028453
§ 371 (c)(1),
(2) Date: Jan. 15, 2021

(87) PCT Pub. No.: WO2020/017635
PCT Pub. Date: Jan. 23, 2020

(65) Prior Publication Data
US 2021/0262481 A1 Aug. 26, 2021

(30) Foreign Application Priority Data
Jul. 19, 2018 (JP) .............................. JP2018-135971

(51) Int. Cl.
*F04D 29/08* (2006.01)
*F04D 27/00* (2006.01)
(Continued)

(52) U.S. Cl.
CPC ......... *F04D 29/086* (2013.01); *F04D 27/001* (2013.01); *F04D 27/008* (2013.01);
(Continued)

(58) Field of Classification Search
CPC .......... F16J 15/18; F16J 15/34; F16J 15/3438; F16J 15/447; F16J 15/406; F16J 15/441;
(Continued)

(56) References Cited

U.S. PATENT DOCUMENTS 5,827,042 A * 10/1998 Ramsay ................ F04D 29/047
415/231
5,865,441 A 2/1999 Orlowski
(Continued)

FOREIGN PATENT DOCUMENTS

CN 101589236 A 11/2009
CN 103711724 A 4/2014
(Continued)

OTHER PUBLICATIONS

Japan Patent Office, International Search Report in International Application No. PCT/JP2019/028453 (dated Sep. 17, 2019).
(Continued)

*Primary Examiner* — Igor Kershteyn
(74) *Attorney, Agent, or Firm* — Leydig Voit and Mayer, Ltd.

(57) ABSTRACT

The present invention relates to a sealing system for a pump configured to pressurize a volatile liquid, such as liquid ammonia. The sealing system (2) includes a stuffing box (35) forming a barrier chamber (30) and a pump-side seal chamber (43), a mechanical seal (20) arranged in the barrier chamber (30), and a barrier-gas supply system (32) for supplying a barrier gas into the barrier chamber (30). The barrier gas has a pressure higher than a pressure of the volatile liquid in the pump-side seal chamber (43). The pump-side seal chamber (43) is located between an impeller (7) of the pump (1) and the mechanical seal (20). The barrier-gas supply system (32) includes a pressure control valve (50) configured to maintain a constant difference between pressure in the barrier chamber (30) and pressure in the pump-side seal chamber (43).

30 Claims, 8 Drawing Sheets

(51) Int. Cl.

| | |
|---|---|
| *F04D 29/40* | (2006.01) |
| *F16J 15/18* | (2006.01) |
| *F16J 15/34* | (2006.01) |
| *F16J 15/44* | (2006.01) |
| *F16J 15/447* | (2006.01) |
| *G01F 23/00* | (2022.01) |
| *G01K 13/00* | (2021.01) |
| *G01M 3/28* | (2006.01) |

(52) U.S. Cl.
CPC ......... *F04D 27/009* (2013.01); *F04D 29/406* (2013.01); *F16J 15/18* (2013.01); *F16J 15/34* (2013.01); *F16J 15/447* (2013.01); *G01F 23/00* (2013.01); *G01K 13/00* (2013.01); *G01M 3/2853* (2013.01)

(58) Field of Classification Search
CPC . F04D 1/06; F04D 7/02; F04D 27/009; F04D 27/001; F04D 27/008; F04D 29/406; F04D 29/128; F04D 29/086; G01K 13/00; G01F 23/00; G01M 3/2853
See application file for complete search history.

(56) References Cited

U.S. PATENT DOCUMENTS

| | | | |
|---|---|---|---|
| 6,210,103 B1 * | 4/2001 | Ramsay | ............. F04D 29/0413 |
| | | | 415/230 |
| 6,524,059 B1 * | 2/2003 | Nogiwa | ............... F16J 15/3492 |
| | | | 415/113 |
| 9,297,377 B2 | 3/2016 | Veland | |
| 9,885,246 B2 | 2/2018 | Flegler et al. | |
| 2005/0212217 A1 | 9/2005 | Tejima | |
| 2009/0039108 A1 * | 2/2009 | Cohen-Zada | .......... F16J 15/181 |
| | | | 277/512 |
| 2010/0080686 A1 | 4/2010 | Teragaki | |
| 2014/0161587 A1 * | 6/2014 | Shamseldin | ......... F16J 15/3492 |
| | | | 73/40 |
| 2014/0321972 A1 * | 10/2014 | Del Vescovo | ........ F04D 29/124 |
| | | | 415/112 |
| 2015/0123395 A1 | 5/2015 | Weinmann | |

FOREIGN PATENT DOCUMENTS

| | | | |
|---|---|---|---|
| DE | 19722730 A1 * | 12/1998 | ........... F04D 29/128 |
| DE | 19722730 A1 | 12/1998 | |
| DE | 102010054873 A1 | 6/2012 | |
| EP | 2233802 A2 | 9/2010 | |
| JP | H02-54972 U | 4/1990 | |
| JP | H06-42650 A | 2/1994 | |
| JP | H09-196184 A | 7/1997 | |
| JP | 2005-180652 A | 7/2005 | |
| JP | 2008-175182 A | 7/2008 | |
| JP | 2010-223332 A | 10/2010 | |
| JP | 2012-167708 A | 9/2012 | |
| JP | 2014-240699 A | 12/2014 | |
| RU | 2439377 C2 | 1/2012 | |
| RU | 157057 U1 | 11/2015 | |
| RU | 2612979 C2 | 3/2017 | |

OTHER PUBLICATIONS

European Patent Office, Supplementary Search Report in European Patent Application No. 19837694.9 (dated Feb. 24, 2022).

* cited by examiner

SEALING SYSTEM, AND PUMP SYSTEM INCLUDING THE SEALING SYSTEM

CROSS-REFERENCE TO RELATED APPLICATIONS

This patent application is the U.S. national phase of International Application No. PCT/JP2019/028453, filed Jul. 19, 2019, which claims the benefit of Japanese Patent Application No. 2018-135971, filed on Jul. 19, 2018, which are incorporated by reference in their entireties herein.

TECHNICAL FIELD

The present invention relates to a sealing system applicable to a pump for pressurizing a volatile liquid, such as liquid ammonia.

BACKGROUND ART

A volatile liquid composed of volatile substance, such as ammonia, ethylene, or propylene, vaporizes under atmospheric pressure and diffuses into the surrounding atmosphere. Therefore, a pump for pressurizing the volatile liquid is required to prevent leakage of the volatile liquid. Thus, the pump includes a mechanical seal to prevent the leakage of the volatile liquid. In addition, a gas sealing system is coupled to the pump. This gas sealing system is configured to supply a high-pressure barrier gas to an outer peripheral side of the mechanical seal in order to prevent leakage of the volatile liquid through sealing surfaces which are contact surfaces of a rotating-side seal ring and a stationary-side seal ring of the mechanical seal.

The mechanical seal is arranged in a barrier chamber, and the high-pressure barrier gas is introduced into the barrier chamber. The barrier gas flows into an inner peripheral side of the mechanical seal through a minute gap between the sealing surfaces of the rotating-side seal ring and the stationary-side seal ring. The volatile liquid in the pump flows along a rotating shaft of the pump to reach the mechanical seal, while the flow of the barrier gas formed in the gap between the sealing surfaces prevents the volatile liquid from entering the barrier chamber. In this manner, the combination of the mechanical seal and the barrier-gas sealing system can prevent the leakage of the volatile liquid into the surrounding atmosphere.

CITATION LIST

Patent Literature

Patent document 1: U.S. Pat. No. 5,865,441

SUMMARY OF INVENTION

Technical Problem

However, when the sealing surfaces are damaged, a flow rate of the barrier gas passing through the gap between the sealing surfaces increases, and as a result, the pressure in the barrier chamber decreases. Furthermore, since the pressure of the volatile liquid is likely to change depending on the environmental temperature, the pressure of the volatile liquid in the pump may increase. If the pressure of the barrier gas in the barrier chamber is lower than the pressure of the volatile liquid that has reached the sealing surfaces, the volatile liquid leaks into the barrier chamber.

If the volatile liquid enters the sealing surfaces, the volatile liquid will damage the mechanical seal. At that time, if sufficient pressure is maintained in the barrier chamber, the volatile liquid leaks in a liquid state. If the sealing surfaces at the atmospheric side is damaged by the influence of liquid or some other influence, the pressure in the barrier chamber may decrease. In that case, the volatile liquid changes into a gas-liquid two-phase fluid with a rapid temperature drop, which can cause a serious damage to the mechanical seal. If the mechanical seal cannot perform its sealing function, the volatile substance may leak into the surrounding atmosphere, thus causing environmental pollution.

Therefore, the present invention provides a sealing system capable of reliably preventing leakage of a volatile liquid into the surrounding atmosphere. Furthermore, the present invention provides a pump system having such a sealing system.

Solution to Problem

In one aspect, there is provided a sealing system for a pump configured to pressurize a volatile liquid, comprising: a stuffing box that forms a barrier chamber and a pump-side seal chamber; a mechanical seal located in the barrier room; and a barrier-gas supply system configured to supply a barrier gas into the barrier chamber, the barrier gas having a pressure higher than a pressure of the volatile liquid in the pump-side seal chamber, wherein the pump-side seal chamber is located between an impeller of the pump and the mechanical seal, and the barrier-gas supply system includes a pressure control valve configured to maintain a constant difference between the pressure in the barrier chamber and the pressure in the pump-side seal chamber.

In one aspect, the sealing system further comprises: a relief line coupled to the barrier chamber; a pressure relief valve attached to the relief line; and a valve actuator configured to open the pressure relief valve when a pressure in the relief line is out of a preset pressure range.

In one aspect, the sealing system further comprises a signal transmitter configured to emit a pump stop signal when the pressure in the relief line is out of the pressure range.

In one aspect, the sealing system further comprises a pressure accumulator coupled to In one aspect, the sealing system further comprises: a drain pot coupled to the relief line; and a liquid level detector configured to detect a liquid level in the drain pot.

In one aspect, the stuffing box further forms an atmospheric-side seal chamber located at an atmospheric side of the mechanical seal, the sealing system further comprises an atmospheric-side non-contact seal, a barrier-gas inflow line, and a barrier-gas recovery line, the atmospheric-side non-contact seal is located in the atmospheric-side seal chamber, the barrier-gas inflow line and the barrier-gas recovery line are in communication with the atmospheric-side seal chamber, and the barrier-gas inflow line is coupled to the barrier-gas supply system.

In one aspect, the atmospheric-side non-contact seal is a floating seal or a labyrinth seal surrounding a rotating shaft of the pump.

In one aspect, the stuffing box further forms an atmospheric-side seal chamber located at an atmospheric side of the mechanical seal, the sealing system further comprises an atmospheric-side non-contact seal, a solvent-solution supply line, and a solvent-solution recovery line, the atmospheric-side non-contact seal is located in the atmospheric-side seal chamber, and the solvent-solution supply line and the solvent-solution recovery line are in communication with the atmospheric-side seal chamber.

In one aspect, the atmospheric-side non-contact seal is a floating seal or a labyrinth seal surrounding a rotating shaft of the pump.

In one aspect, the sealing system further comprises an interior non-contact seal provided in the barrier chamber.

In one aspect, the interior non-contact seal is a labyrinth seal.

In one aspect, the barrier-gas supply system has a barrier-gas supply opening facing the barrier chamber, and the interior non-contact seal is located at the atmospheric side of the barrier-gas supply opening.

In one aspect, the sealing system further comprises a pump-side non-contact seal arranged in the pump-side seal chamber.

In one aspect, the pump-side non-contact seal is a floating seal or labyrinth seal that surrounds rotating shaft of the pump.

In one aspect, the mechanical seal is a double mechanical seal including a first rotating-side seal ring and a first stationary-side seal ring which are in contact with each other, and further including a second rotating-side seal ring and a second stationary-side seal ring which are in contact with each other.

In one aspect, the sealing system further comprises: a first temperature sensor configured to measure a temperature of the first stationary-side seal ring; and a second temperature sensor configured to measure a temperature of the second stationary-side seal ring.

In one aspect, there is provided a pump system for pressurizing a volatile liquid, comprising: a rotating shaft; an impeller fixed to the rotating shaft; a casing in which the impeller is disposed; a stuffing box that forms a barrier chamber and a pump-side seal chamber; a mechanical seal located in the barrier room; and a barrier-gas supply system configured to supply a barrier gas into the barrier chamber, the barrier gas having a pressure higher than a pressure of the volatile liquid in the pump-side seal chamber, wherein the pump-side seal chamber is located between the impeller and the mechanical seal, and the barrier-gas supply system includes a pressure control valve configured to maintain a constant difference between the pressure in the barrier chamber and the pressure in the pump-side seal chamber.

In one aspect, the pump system further comprises: a relief line coupled to the barrier chamber; a pressure relief valve attached to the relief line; and a valve actuator configured to open the pressure relief valve when a pressure in the relief line is out of a preset pressure range.

In one aspect, the pump system further comprises a signal transmitter configured to emit a pump stop signal when the pressure in the relief line is out of the pressure range.

In one aspect, the pump system further comprises a pressure accumulator coupled to the relief line.

In one aspect, the pump system further comprises: a drain pot coupled to the relief line; and a liquid level detector configured to detect a liquid level in the drain pot.

In one aspect, the stuffing box further forms an atmospheric-side seal chamber located at an atmospheric side of the mechanical seal, the pump system further comprises an atmospheric-side non-contact seal, a barrier-gas inflow line, and a barrier-gas recovery line, the atmospheric-side non-contact seal is located in the atmospheric-side seal chamber, the barrier-gas inflow line and the barrier-gas recovery line are in communication with the atmospheric-side seal chamber, and the barrier-gas inflow line is coupled to the barrier-gas supply system.

In one aspect, the atmospheric-side non-contact seal is a floating seal or a labyrinth seal surrounding the rotating shaft.

In one aspect, the stuffing box further forms an atmospheric-side seal chamber located at an atmospheric side of the mechanical seal, the sealing system further comprises an atmospheric-side non-contact seal, a solvent-solution supply line, and a solvent-solution recovery line, the atmospheric-side non-contact seal is located in the atmospheric-side seal chamber, and the solvent-solution supply line and the solvent-solution recovery line are in communication with the atmospheric-side seal chamber.

In one aspect, the atmospheric-side non-contact seal is a floating seal surrounding the rotating shaft.

In one aspect, the pump system further comprises an interior non-contact seal provided in the barrier chamber.

In one aspect, the interior non-contact seal is a labyrinth seal.

In one aspect, the barrier-gas supply system has a barrier-gas supply opening facing the barrier chamber, and the interior non-contact seal is located at the atmospheric side of the barrier-gas supply opening.

In one aspect, the pump system further comprises a pump-side non-contact seal arranged in the pump-side seal chamber.

In one aspect, the pump-side non-contact seal is a floating seal or labyrinth seal that surrounds the rotating shaft.

In one aspect, the mechanical seal is a double mechanical seal including a first rotating-side seal ring and a first stationary-side seal ring which are in contact with each other, and further including a second rotating-side seal ring and a second stationary-side seal ring which are in contact with each other.

In one aspect, the pump system further comprises: a first temperature sensor configured to measure a temperature of the first stationary-side seal ring; and a second temperature sensor configured to measure a temperature of the second stationary-side seal ring.

Advantageous Effects of Invention

According to the present invention, the pressure of the barrier gas in the barrier chamber is always kept higher than the pressure of the volatile liquid, regardless of change in the pressure in the barrier chamber and/or the pressure in the pump-side seal chamber. Therefore, the sealing system according to the present invention can prevent the volatile liquid from leaking into the barrier chamber.

The volatile fluid (which may be in a liquid phase, a gas phase, or a gas-liquid two phase) can be recovered through the pressure relief valve and the relief line, even if the volatile liquid leaks into the barrier chamber due to damage to the sealing surfaces. Moreover, the non-contact seal can block the flow of the volatile fluid and can prevent the volatile fluid from leaking to the surrounding atmosphere.

DESCRIPTION OF EMBODIMENTS

Hereinafter, embodiments of the present invention will be described with reference to the drawings.

Figure 1:
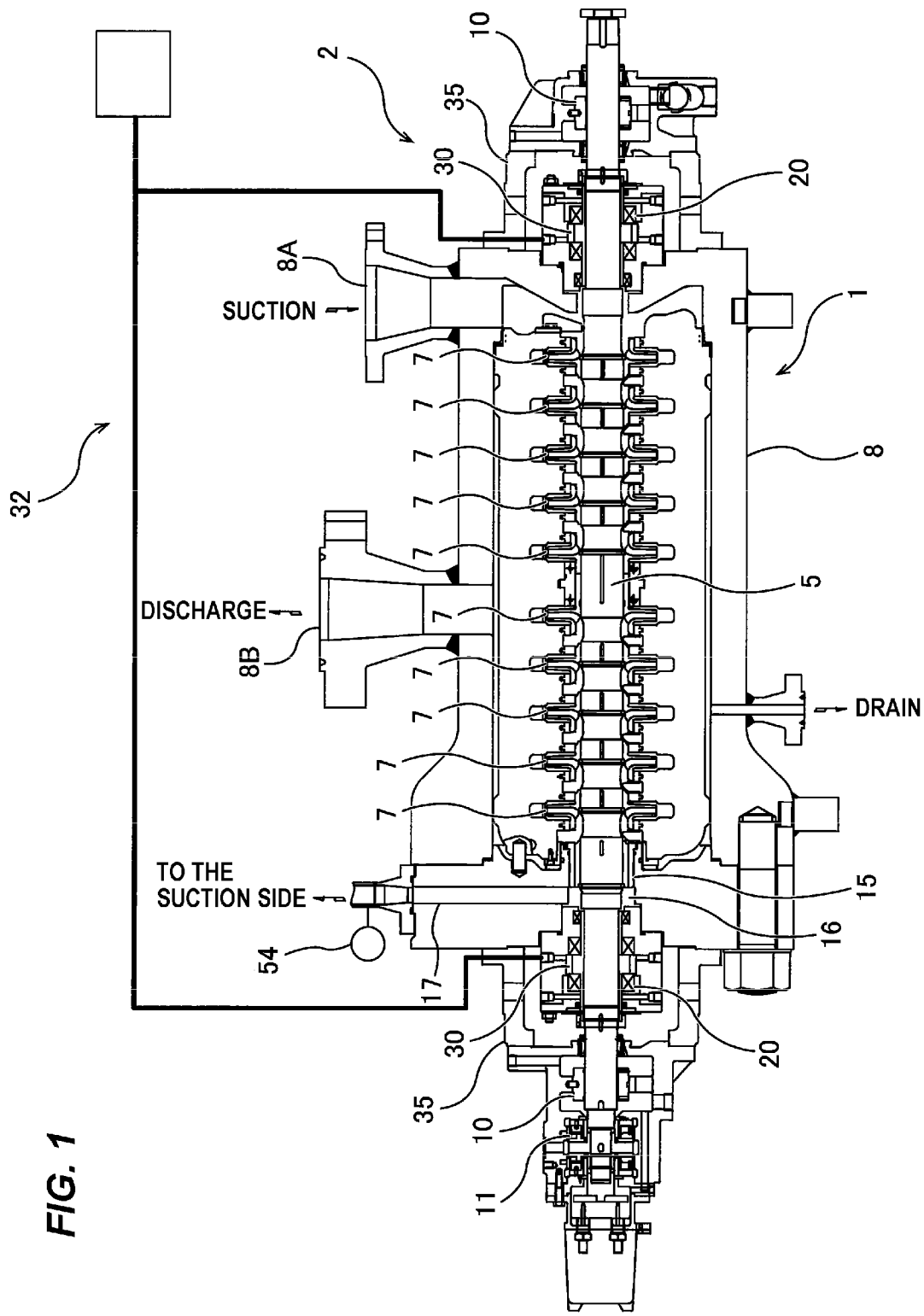
FIG. 1 is a diagram showing an embodiment of a pump system.

FIG. 1 is a diagram showing an embodiment of a pump system. This pump system includes a pump 1 for pressurizing a volatile liquid and a sealing system 2 for preventing the volatile liquid from leaking to the surrounding atmosphere. In this embodiment, the pump 1 is a multistage pump. Specifically, the pump 1 includes a rotating shaft 5, a plurality of impellers 7 fixed to the rotating shaft 5, and a casing 8 in which the impellers 7 are housed. In the present embodiment, half of the plurality of impellers 7 face in one direction, and the other half face in the opposite direction. Such arrangement of the impellers 7 makes it possible to cancel thrust forces acting on the impellers 7 when the impellers 7 are rotated to pressurize the volatile liquid. In one embodiment, the plurality of impellers 7 may face in the same direction. In another embodiment, the pump 1 may be a single-stage pump with one impeller.

The rotating shaft 5 is rotatably supported by two radial bearings 10 and one thrust bearing 11. The rotating shaft 5 is coupled to a not-shown prime mover (electric motor, internal combustion engine, etc.) and is rotated by the prime mover. The impellers 7 rotate together with the rotating shaft 5. The casing 8 has a suction port 8A and a discharge port 8B for the volatile liquid. The volatile liquid is introduced into the casing 8 through the suction port 8A. As the impellers 7 rotate, the volatile liquid is pressurized in the casing 8 and discharged from the casing 8 through the discharge port 8B.

A balance mechanism 15 is arranged between one of the two radial bearings 10 and the impellers 7. The balance mechanism 15 is a device that reduces the pressure of the volatile liquid pressurized by the rotation of the impellers 7 to a pressure corresponding to a suction pressure. A balance chamber 16, which is located at the atmospheric side of the balance mechanism 15, is coupled through the balance line 17 to the suction port 8A, or to a volatile-liquid delivery pipe (not shown) coupled to the suction port 8A, or to a volatile-liquid supply source (not shown). Therefore, the pressure in the balance chamber 16 is substantially the same as the suction pressure.

The liquid to be handled by the pump 1 is volatile liquid. In this specification, volatile liquid is a liquid composed of a volatile substance that exists in a gaseous state under the atmospheric pressure. More specifically, volatile liquid is a liquid which is more volatile than water, in other words, a liquid that has a lower boiling point than water. Specific examples of the volatile liquid include liquid ammonia, ethylene, propylene, carbon dioxide, alcohol, butane, and propane. The volatile liquid is supplied in a pre-pressurized state to the pump 1 from the volatile-liquid supply source (not shown).

If the volatile liquid leaks from the pump 1, it vaporizes and diffuses into the surrounding atmosphere. Therefore, the sealing system 2 is provided to prevent leakage of the volatile liquid. The sealing system 2 includes two mechanical seals 20 arranged at atmospheric sides of the impellers 7, and a barrier-gas supply system 32 configured to supply a barrier gas into two barrier chambers 30 in which the two mechanical seals 20 are housed, respectively. The two mechanical seals 20 are located in two stuffing boxes 35, respectively. Specifically, each barrier chamber 30 is formed by each stuffing box 35, and each mechanical seal 20 is located in each barrier chamber 30. The two stuffing boxes 35 are fixed to both sides of the casing 8.

Figure 2:
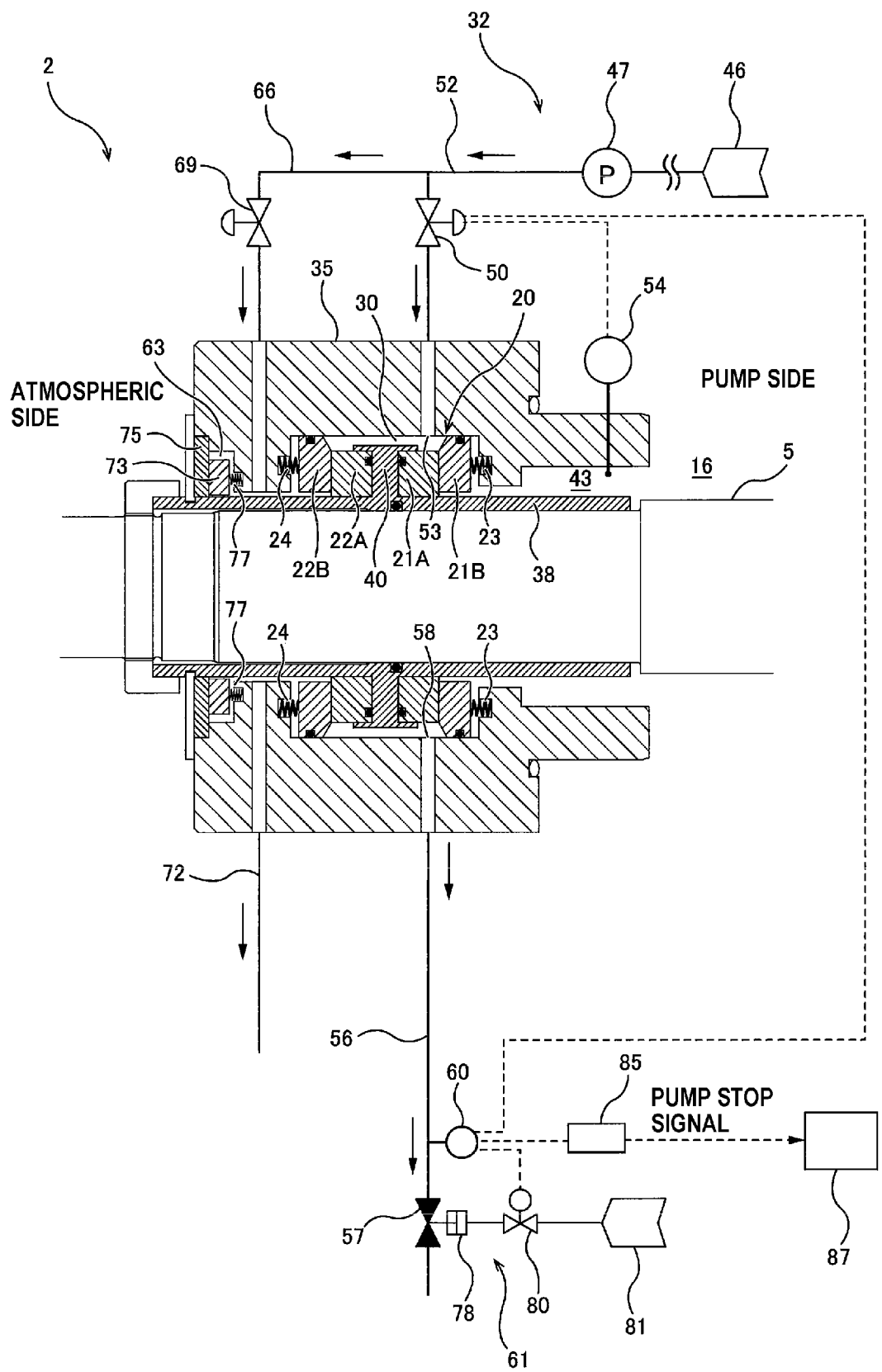
FIG. 2 is an enlarged view showing an embodiment of a sealing system including a mechanical seal.

FIG. 2 is an enlarged view showing an embodiment of the sealing system 2 including the mechanical seals 20. In FIG. 2, of the two mechanical seals 20, one mechanical seal 20 adjacent to the balance chamber 16 is shown. Since the other mechanical seal 20 arranged at the suction side has the same configuration, the repetitive descriptions thereof will be omitted.

The sealing system 2 according to the present embodiment is a gas sealing system that seals the volatile liquid with the mechanical seals 20 and the barrier gas. As shown in FIG. 2, each mechanical seal 20 of the present embodiment is a double mechanical seal including two pairs of rotating-side seal rings 21A and 22A and stationary-side seal rings 21B and 22B. More specifically, the mechanical seal 20 includes a first rotating-side seal ring 21A and a first stationary-side seal ring 21B which are in contact with each other, and a second rotating-side seal ring 22A and a second stationary-side seal ring 22B which are in contact with each other. The mechanical seal 20 further has first springs 23 that press the first stationary-side seal ring 21B against the first rotating-side seal ring 21A, and second springs 24 that press the second stationary-side seal ring 22B against the second rotating-side seal ring 22A.

A shaft sleeve 38 is fixed to the outer peripheral surface of the rotating shaft 5. The first rotating-side seal ring 21A and the second rotating-side seal ring 22A are secured to the shaft sleeve 38. More specifically, a seal-ring holder 40 is fixed to the shaft sleeve 38, and the first rotating-side seal ring 21A and the second rotating-side seal ring 22A are held by the seal-ring holder 40 and an outer peripheral surface of the shaft sleeve 38. The rotating shaft 5, the shaft sleeve 38, the first rotating-side seal ring 21A, and the second rotating-side seal ring 22A are rotatable integrally.

The first stationary-side seal ring 21B and the second stationary-side seal ring 22B are supported by the stuffing box 35 so as to be movable in an axial direction. The first springs 23 and the second springs 24 are held by the stuffing box 35. The first stationary-side seal ring 21B, the second stationary-side seal ring 22B, the first springs 23, and the second springs 24 do not rotate. The two pairs of rotating-side seal rings 21A and 22A and stationary-side seal rings 21B and 22B are arranged symmetrically with respect to a plane (which is an imaginary surface) perpendicular to the rotating shaft 5. The first rotating-side seal ring 21A and the first stationary-side seal ring 21B are arranged at a pump side, and the second rotating-side seal ring 22A and the second stationary-side seal ring 22B are arranged at an atmospheric side.

The mechanical seal 20 is located in the barrier chamber 30. The barrier chamber 30 is formed by the inner surface of the stuffing box 35. Further, a pump-side seal chamber 43 is provided at the pump side of the mechanical seal 20. The pump-side seal chamber 43 is also formed by the inner surface of the stuffing box 35. The pump-side seal chamber 43 is located between the impellers 7 and the mechanical seal 20.

The volatile liquid in the casing 8 flows along the rotating shaft 5 and flows into the pump-side seal chamber 43 to fill the pump-side seal chamber 43. The pump-side seal chamber 43 shown in FIG. 2 is in communication with the balance chamber 16. Therefore, the volatile liquid reaches the pump-side seal chamber 43 after passing through the balance chamber 16. The pressure in the pump-side seal chamber 43 is the same as the pressure in the balance chamber 16.

The barrier-gas supply system 32 is configured to supply the barrier gas, having pressure higher than the pressure of the volatile liquid in the pump-side seal chamber 43, into the barrier chamber 30. Specifically, the barrier-gas supply system 32 includes a compressor 47 for pressurizing the barrier gas supplied from a barrier-gas supply source 46, a pressure control valve 50 configured to regulate the pressure of the barrier gas in the barrier chamber 30, a barrier-gas supply line 52 extending from the barrier-gas supply source 46 to the barrier chamber 30, and a liquid pressure sensor 54 configured to measure the pressure of the volatile liquid in the pump-side seal chamber 43.

The compressor 47 and the pressure control valve 50 are coupled to the barrier-gas supply line 52. The pressure control valve 50 is arranged downstream of the compressor 47. One end of the barrier-gas supply line 52 is coupled to the barrier-gas supply source 46, and the other end of the barrier-gas supply line 52 is coupled to the barrier chamber 30. The barrier-gas supply system 32 has a barrier-gas supply opening 53 facing the barrier chamber 30. The barrier-gas supply opening 53 is composed of an open end of the barrier-gas supply line 52. The barrier gas supplied from the barrier-gas supply source 46 is pressurized by the compressor 47, passes through the pressure control valve 50, and flows through the barrier-gas supply line 52 into the barrier chamber 30 from the barrier-gas supply opening 53.

Examples of the barrier gas include an inert gas (e.g., nitrogen), carbon dioxide gas, and air. The barrier gas is a fluid different from the above-mentioned volatile liquid. The barrier-gas supply source 46 may be an inert-gas supply source provided as a utility equipment in a facility where the pump system is installed, or may be a nitrogen-gas storage tank that stores therein a nitrogen gas which has been discharged in a process of producing the volatile liquid. If the pressure of the barrier gas supplied from the barrier-gas supply source 46 is sufficiently higher than the pressure of the volatile liquid in the pump-side seal chamber 43, the compressor 47 may not be provided.

In FIG. 2, an installation position of the liquid pressure sensor 54 is schematically illustrated. The liquid pressure sensor 54 is a pressure measuring device for measuring the pressure of the volatile liquid in the pump-side seal chamber 43. In this specification, both directly measuring the pressure of the volatile liquid in the pump-side seal chamber 43 and measuring pressure corresponding to the pressure of the volatile liquid in the pump-side seal chamber 43 mean measuring the pressure of the volatile liquid in the pump-side seal chamber 43.

The installation position of the liquid pressure sensor 54 is not particularly limited so long as the liquid pressure sensor 54 can measure the pressure of the volatile liquid in the pump-side seal chamber 43 or the pressure corresponding to the pressure of the volatile liquid in the pump-side seal chamber 43. For example, the liquid pressure sensor 54 may be coupled to the pump-side seal chamber 43. In this case, the liquid pressure sensor 54 can directly measure the pressure of the volatile liquid in the pump-side seal chamber 43. In one embodiment, as shown in FIG. 1, the liquid pressure sensor 54 may be coupled to the balance line 17, or may be coupled to the suction port 8A of the casing 8, or may be coupled to the volatile-liquid delivery pipe (not shown) coupled to the suction port 8A. Since the pressure in the balance line 17 is substantially the same as the pressure in the pump-side seal chamber 43, the liquid pressure sensor 54 coupled to the balance line 17 can measure the pressure corresponding to the pressure of the volatile liquid in the pump-side seal chamber 43. The pressure of the volatile liquid in the suction port 8A of the casing 8 and the pressure of the volatile liquid in the volatile-liquid delivery pipe are also substantially the same as the pressure in the pump-side seal chamber 43.

In a case where the balance mechanism 15, the balance chamber 16, and the balance line 17 are not provided, the pressure of the volatile liquid in the pump-side seal chamber 43 corresponds to the discharge pressure of the pump 1. In this case, the liquid pressure sensor 54 may be coupled to the discharge port 8B of the casing 8.

As shown in FIG. 2, the sealing system 2 further includes a relief line 56 coupled to the barrier chamber 30, a pressure relief valve 57 attached to the relief line 56, a gas pressure sensor 60 for measuring pressure in the relief line 56, and a valve actuator 61 configured to open the pressure relief valve 57 when the pressure in the relief line 56 is out of a preset pressure range. The gas pressure sensor 60 is located between the barrier chamber 30 and the pressure relief valve 57. The relief line 56 has a fluid inlet 58 facing the barrier chamber 30. The barrier gas that has supplied from the barrier-gas supply system 32 into the barrier chamber 30 flows through the fluid inlet 58 into the relief line 56.

The pressure relief valve 57 is normally closed. Therefore, during normal operation, the inside of the relief line 56 is filled with the barrier gas, but the flow of the barrier gas is not substantially formed in the relief line 56. Since the relief line 56 communicates with the barrier chamber 30, the pressure in the barrier chamber 30 is the same as the pressure in the relief line 56. Therefore, the gas pressure sensor 60 coupled to the relief line 56 can measure the pressure corresponding to the pressure in the barrier chamber 30. In the present specification, both directly measuring the pressure in the barrier chamber 30 and measuring the pressure corresponding to the pressure in the barrier chamber 30 mean measuring the pressure in the barrier chamber 30.

The gas pressure sensor 60 is electrically coupled to the pressure control valve 50, so that the gas pressure sensor 60 transmits a measured value of pressure (i.e., a measured value of pressure in the barrier chamber 30) to the pressure control valve 50. The liquid pressure sensor 54 is also electrically coupled to the pressure control valve 50, so that the liquid pressure sensor 54 transmits a measured value of pressure (i.e., a measured value of pressure in the pump-side seal chamber 43) to the pressure control valve 50. The pressure control valve 50 is configured such that a difference between the measured value of the pressure transmitted from the liquid pressure sensor 54 and the measured value of the pressure transmitted from the gas pressure sensor 60 (i.e., a difference between the pressure in the pump-side seal chamber 43 and the pressure in the barrier chamber 30) is kept constant. More specifically, the pressure control valve 50 operates such that the pressure of the barrier gas in the barrier chamber 30 is kept higher than the pressure of the volatile liquid in the pump-side seal chamber 43 by a predetermined bias value. Specific examples of the pressure control valve 50 include an actuator-driven differential pressure control valve.

According to the present embodiment, the pressure of the barrier gas in the barrier chamber 30 is always kept higher than the pressure of the volatile liquid even if the pressure in the barrier chamber 30 and/or the pressure in the pump-side seal chamber 43 changes. Therefore, the barrier gas in the barrier chamber 30 flows into the pump-side seal chamber 43 through a minute gap between sealing surfaces which are contact surfaces of the first rotating-side seal ring 21A and the first stationary-side seal ring 21B. Such a flow of the barrier gas can prevent the volatile liquid from leaking into the barrier chamber 30.

An atmospheric-side seal chamber 63 is provided at the atmospheric side of the mechanical seal 20. The atmospheric-side seal chamber 63 is formed by the inner surface of the stuffing box 35. The barrier chamber 30 is located between the pump-side seal chamber 43 and the atmospheric-side seal chamber 63. The barrier gas in the barrier chamber 30 also flows into the atmospheric-side seal chamber 63 through a minute gap between sealing surfaces which are contact surfaces of the second rotating-side seal ring 22A and the second stationary-side seal ring 22B. The stuffing box 35, which forms the barrier chamber 30, the pump-side seal chamber 43, and the atmospheric-side seal chamber 63, is a single structure, while in one embodiment, the stuffing box 35 may be composed of a combination of a plurality of structures.

The sealing system 2 further includes a barrier-gas inflow line 66 coupled to the barrier-gas supply system 32, a pressure control valve 69 attached to the barrier-gas inflow line 66, a barrier-gas recovery line 72 communicating with the atmospheric-side seal chamber 63, and a floating seal 73 serving as an atmospheric-side non-contact seal provided in the atmospheric-side seal chamber 63. One end of the barrier-gas inflow line 66 is coupled to the barrier-gas supply line 52, and the other end of the barrier-gas inflow line 66 communicates with the atmospheric-side seal chamber 63. The pressure control valve 69 is a pressure reducing valve configured to reduce the pressure of the barrier gas sent from the barrier-gas supply system 32 to a predetermined pressure that is higher than the atmospheric pressure. A connection point of the barrier-gas inflow line 66 and the barrier-gas supply line 52 is located upstream of the pressure control valve 50 and located downstream of the compressor 47.

The floating seal 73 is pressed by springs 77 against a retaining ring 75 fixed to the stuffing box 35. The floating seal 73 is arranged so as to surround the rotating shaft 5. More specifically, the floating seal 73 is arranged around the shaft sleeve 38 fixed to the outer peripheral surface of the rotating shaft 5. The rotating shaft 5 and the shaft sleeve 38 extend through the floating seal 73. A minute gap is formed between an inner peripheral surface of the floating seal 73 and the outer peripheral surface of the shaft sleeve 38, so that the floating seal 73 is out of contact with the shaft sleeve 38 and the rotating shaft 5. The floating seal 73 is in an annular shape and is composed of, for example, carbon ring.

The barrier gas is introduced into the atmospheric-side seal chamber 63 through the barrier-gas inflow line 66, and further flows out of the atmospheric-side seal chamber 63 through the barrier-gas recovery line 72. In this way, the flow of the barrier gas is always formed in the atmospheric-side seal chamber 63. The barrier gas that has flowed from the barrier chamber 30 through the gap between the sealing surfaces of the second rotating-side seal ring 22A and the second stationary-side seal ring 22B flows into the barrier-gas recovery line 72 together with the barrier gas introduced from the barrier-gas inflow line 66. The barrier gas that has flowed through the barrier-gas recovery line 72 may be recovered or discharged to a flare stack. In one embodiment, the atmospheric-side non-contact seal arranged in the atmospheric-side seal chamber 63 may be a labyrinth seal, instead of the floating seal 73.

If the sealing surfaces of the seal rings 22A and 22B at the atmospheric side are damaged for some reason, the pressure in the barrier chamber 30 drops. In that case, the volatile liquid in the pump-side seal chamber 43 leaks into the barrier chamber 30 through the sealing surfaces of the seal rings 21A and 21B. The volatile liquid changes into a gas-liquid two-phase fluid in the barrier chamber 30 with a temperature drop, and its volume expands. Such a low-temperature gas-liquid two-phase fluid may damage the mechanical seal 20 and may destroy the mechanical seal 20.

Thus, in order to prevent such damage to the mechanical seal 20, the valve actuator 61 opens the pressure relief valve 57 when the pressure in the relief line 56 is out of the preset pressure range. When the volatile liquid leaks into the barrier chamber 30, at least a part of the volatile liquid is vaporized. As a result, the pressure in the relief line 56 communicating with the barrier chamber 30 increases. The gas pressure sensor 60 detects this increase in pressure and activates the valve actuator 61. The valve actuator 61 opens the pressure relief valve 57 to allow the volatile fluid (which may be in a liquid phase, a gas phase, or a gas-liquid two-phase) to flow out of the barrier chamber 30 through the relief line 56. The volatile fluid, along with the barrier gas, is recovered through the relief line 56. The recovered volatile fluid may be detoxified by combustion treatment or the like.

In the present embodiment, the valve actuator 61 is composed of a combination of an air cylinder 78 and a working-fluid supply valve 80. The air cylinder 78 is coupled to the pressure relief valve 57 and is configured to open the pressure relief valve 57. The air cylinder 78 is coupled to a working-fluid supply source 81 via the working-fluid supply valve 80. An example of the working-fluid supply source 81 is an air supply source. The air supply source may be an air supply line provided as a utility equipment in the facility where the pump system is installed. In one embodiment, the valve actuator 61 may be a motor driven actuator.

The gas pressure sensor 60 is electrically coupled to the working-fluid supply valve 80 and is configured to transmit a measured value of the pressure in the relief line 56 to the working-fluid supply valve 80. The working-fluid supply valve 80 has a memory (not shown) therein, and an upper limit and a lower limit of the pressure range are stored in this memory in advance. When the measured value of the pressure in the relief line 56 is out of the pressure range, the working-fluid supply valve 80 is opened and a working fluid is supplied from the working-fluid supply source 81 to the air cylinder 78. As a result, the air cylinder 78 operates to open the pressure relief valve 57. The volatile fluid (which may be in a liquid phase, a gas phase, or a gas-liquid two-phase) is discharged from the barrier chamber 30 through the relief line 56.

When the volatile liquid leaks into the barrier chamber 30, the volatile fluid (which may be in a liquid phase, a gas phase, or a gas-liquid two-phase) passes through the gap between the sealing surfaces of the second rotating-side seal ring 22A and the second stationary-side seal ring 22B arranged at the atmospheric side. Even in such a case, the volatile fluid is carried into the barrier-gas recovery line 72 by the barrier gas injected from the barrier-gas inflow line 66, and is recovered together with the barrier gas through the barrier-gas recovery line 72.

As described above, the sealing system 2 of the present embodiment can not only prevent the volatile liquid from leaking into the barrier chamber 30, but also can prevent the volatile liquid (or the volatile fluid) from leaking into the surrounding atmosphere even if the volatile liquid leaks into the barrier chamber 30. Therefore, the present invention can provide the pump system capable of safely handling the volatile liquid.

The gas pressure sensor 60 is electrically coupled to a signal transmitter 85 and is configured to transmit the measured value of the pressure in the relief line 56 to the signal transmitter 85. The signal transmitter 85 has a memory (not shown) therein, and an upper limit and a lower limit of the pressure range are stored in this memory in advance. The signal transmitter 85 is configured to emit a pump stop signal when the measured value of the pressure in the relief line 56 is out of the pressure range. The signal transmitter 85 is coupled to an operation controller 87 via wired communication or wireless communication. The operation controller 87 is configured to control the operation of the prime mover (not shown) of the pump 1. The pump stop signal is transmitted to the operation controller 87, and the operation controller 87 receives the pump stop signal and stops the prime mover of the pump 1. As a result, the operation of the pump 1 is stopped, so that spread of leakage of the volatile liquid can be prevented.

If the sealing surfaces of the pump-side seal rings 21A and 21B are damaged, the volatile liquid may leak into the barrier chamber 30. When sufficient pressure is maintained in the barrier chamber 30, the volatile liquid leaks into the barrier chamber 30 as the volatile liquid maintains its liquid state. However, when the volatile liquid reaches the atmospheric-side seal rings 22A and 22B, the sealing surfaces of the seal rings 22A and 22B may be damaged. In such a case, the pressure in the barrier chamber 30 decreases. Further, if the sealing surfaces of the atmospheric-side seal rings 22A and 22B are damaged for some reason, or if the barrier-gas supply system 32 cannot increase the supply pressure of the barrier gas, the pressure in the barrier chamber 30 drops.

In view of this, when the pressure in the barrier chamber 30 measured by the gas pressure sensor 60 is out of the pressure range (i.e., when the pressure in the barrier chamber 30 is below the lower limit of the pressure range), or when an absolute value of a rate of change of the pressure in the barrier chamber 30 is greater than a predetermined value, the signal transmitter 85 emits a pump stop signal. Further, when the pressure in the barrier chamber 30 drops, it is possible that the leaked volatile liquid will volatilize. Therefore, when the pressure in the barrier chamber 30 measured by the gas pressure sensor 60 is out of the pressure range (i.e., when the pressure in the barrier chamber 30 is below the lower limit of the pressure range), or when the absolute value of the rate of change of the pressure in the barrier chamber 30 is greater than a predetermined value, the valve actuator 61 opens the pressure relief valve 57 to release the volatilized gas-liquid two-phase fluid. Even in such a case, since the barrier gas flows through the atmospheric-side seal chamber 63, the sealing system can reliably prevent the vaporization and diffusion of the volatile liquid into the atmosphere.

Figure 3:
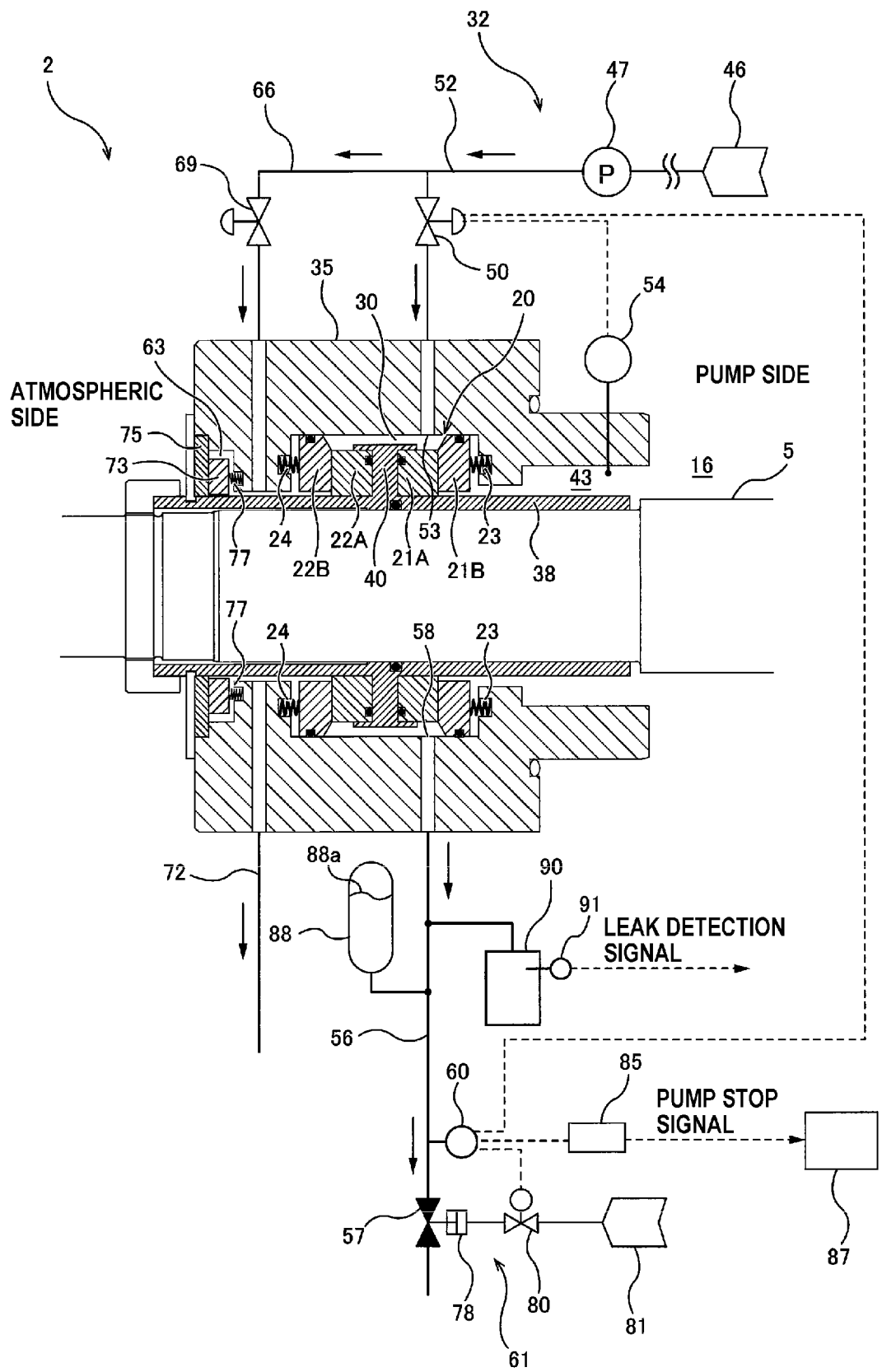
FIG. 3 is a diagram showing another embodiment of the sealing system.

FIG. 3 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 includes a pressure accumulator 88 coupled to the relief line 56. The pressure accumulator 88 is in communication with the barrier chamber 30 through the relief line 56.

A diaphragm 88a is disposed inside the pressure accumulator 88, and a gas, such as nitrogen gas, is enclosed therein. A part of the barrier gas in the relief line 56 is introduced into the pressure accumulator 88 and accumulated in the pressure accumulator 88. The barrier gas accumulated in the pressure accumulator 88 is pressurized by the pressure of the gas previously enclosed in the pressure accumulator 88. When the supply of the barrier gas from the barrier-gas supply system 32 is stopped or the supply pressure of the barrier gas drops for some reason, the pressure accumulator 88 supplies the barrier gas into the barrier chamber 30 through the relief line 56, so that the pressure in the barrier chamber 30 can be kept higher than the pressure of the volatile liquid in the pump-side seal chamber 43.

A drain pot 90 is coupled to the relief line 56. A liquid level detector 91 for detecting a liquid level in the drain pot 90 is attached to the drain pot 90. If the sealing surfaces of the pump-side seal rings 21A and 21B are damaged, the volatile liquid may leak into the barrier chamber 30. When sufficient pressure is maintained in the barrier chamber 30, the volatile liquid leaks into the barrier chamber 30 as the volatile liquid maintains its liquid state. The volatile liquid flows through the relief line 56 and is collected in the drain pot 90. When the liquid level detector 91 detects that the liquid level of the volatile liquid in the drain pot 90 has reached a set level, the liquid level detector 91 emits a leak detection signal. This leak detection signal is transmitted to the operation controller 87. The operation controller 87 receives the leak detection signal and stops the prime mover of the pump 1. The specific configuration of the liquid level detector 91 is not particularly limited, and examples of the liquid level detector 91 include a contact type liquid level sensor, a non-contact type liquid level sensor, and a float switch.

Figure 4:
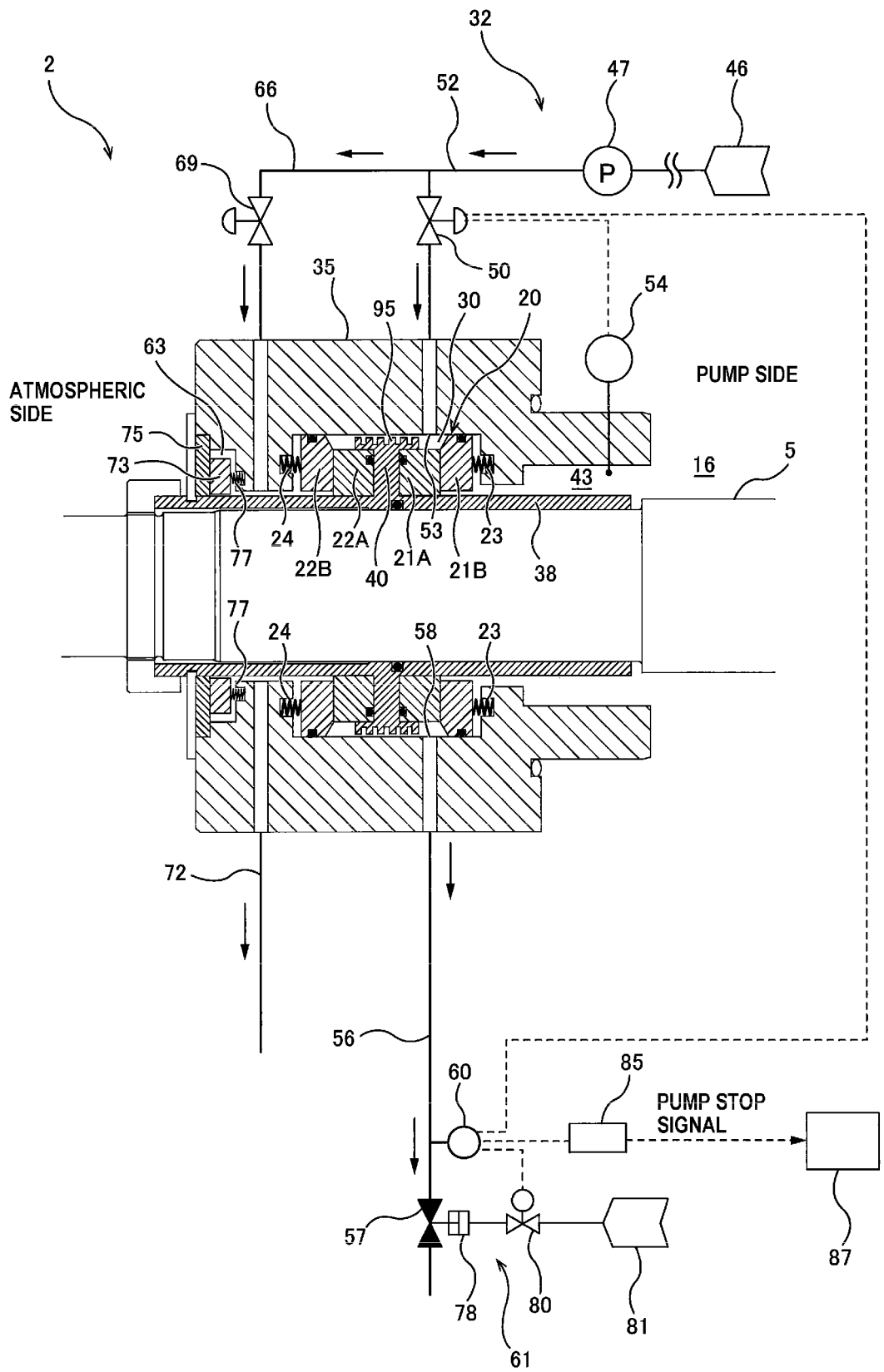
FIG. 4 is a diagram showing another embodiment of the sealing system.

FIG. 4 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 includes a labyrinth seal 95 serving as an interior non-contact seal provided in the barrier chamber 30. This labyrinth seal 95 is provided on the outer peripheral surface of the seal-ring holder 40 fixed to the shaft sleeve 38.

A minute gap is formed between the labyrinth seal 95 and the inner surface of the stuffing box 35 forming the barrier chamber 30. The labyrinth seal 95 is in non-contact with the stuffing box 35. The labyrinth seal 95 is located at the atmospheric side of the barrier-gas supply opening 53 facing the barrier chamber 30. Further, the labyrinth seal 95 is located at the atmospheric side of the fluid inlet 58 facing the barrier chamber 30. The barrier-gas supply opening 53 and the fluid inlet 58 are located between the first stationary-side seal ring 21B and the labyrinth seal 95. The labyrinth seal 95 is located between the first stationary-side seal ring 21B and the second stationary-side seal ring 22B.

A part of the barrier gas supplied from the barrier-gas supply opening 53 into the barrier chamber 30 passes through the minute gap between the sealing surfaces of the first rotating-side seal ring 21A and the first stationary-side seal ring 21B arranged at the pump side, and flows into the pump-side seal chamber 43. At the same time, a part of the barrier gas supplied from the barrier-gas supply opening 53 into the barrier chamber 30 passes through the labyrinth seal 95, flows through the minute gap between the sealing surfaces of the second rotating-side seal ring 22A and the second stationary-side seal ring 22B arranged at the atmospheric side, and flows toward the atmospheric-side seal chamber 63.

Even if the volatile liquid in the pump-side seal chamber 43 leaks into the barrier chamber 30, the volatile fluid (which may be in a gas phase, a liquid phase, or a gas-liquid two-phase) is blocked by the labyrinth seal 95, and is therefore prevented from reaching the second rotating-side seal ring 22A and the second stationary-side seal ring 22B arranged at the atmospheric side.

As described above, when the volatile liquid leaks into the barrier chamber 30, the valve actuator 61 opens the pressure relief valve 57. As a result, a flow of the barrier gas directed from the barrier-gas supply opening 53 to the fluid inlet 58 is formed in the barrier chamber 30. The volatile fluid that has leaked into the barrier chamber 30 flows into the fluid inlet 58 together with the barrier gas, and is recovered through the relief line 56. In this manner, the labyrinth seal 95 has a function of guiding the volatile fluid that has leaked into the barrier chamber 30 to the fluid inlet 58, and can prevent the volatile fluid from flowing to the atmospheric side. In one embodiment, the interior non-contact seal may be a threaded seal, instead of the labyrinth seal 95.

Figure 5:
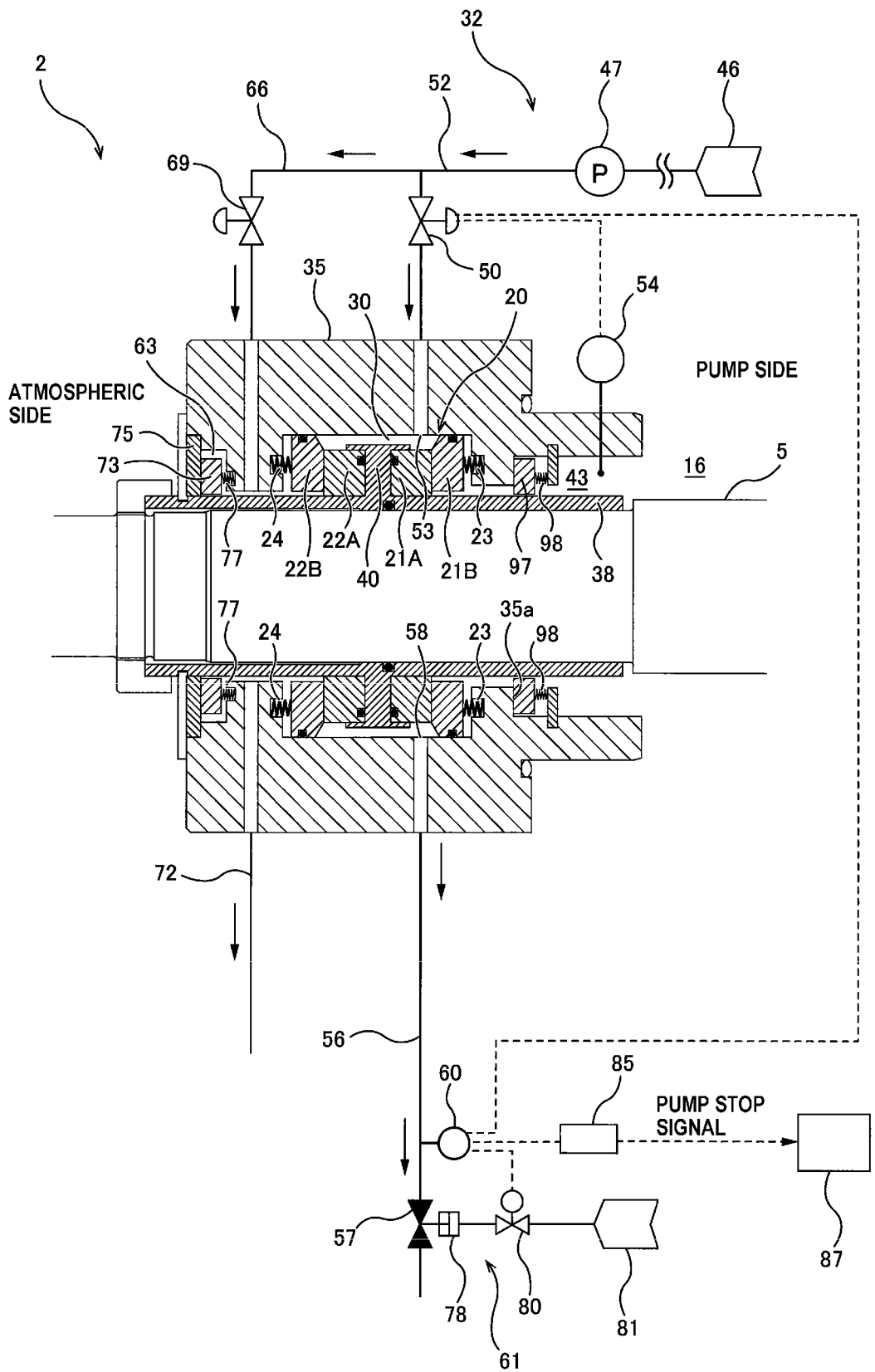
FIG. 5 is a diagram showing another embodiment of the sealing system.

FIG. 5 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 includes a floating seal 97 serving as a pump-side non-contact seal arranged in the pump-side seal chamber 43.

The floating seal 97 is pressed by springs 98 against a vertical surface 35a of the stuffing box 35 forming the pump-side seal chamber 43. The floating seal 97 is arranged so as to surround the rotating shaft 5. More specifically, the floating seal 97 is arranged around the shaft sleeve 38 fixed to the outer peripheral surface of the rotating shaft 5. The rotating shaft 5 and the shaft sleeve 38 extend through the floating seal 97. A minute gap is formed between an inner peripheral surface of the floating seal 97 and the outer peripheral surface of the shaft sleeve 38, so that the floating seal 97 is out of contact with the shaft sleeve 38 and the rotating shaft 5. The floating seal 97 is in an annular shape, and is composed of, for example, carbon ring.

While the mechanical seal 20 is functioning normally, no volatile liquid flow is substantially formed in the pump-side seal chamber 43. When the volatile liquid in the pump-side seal chamber 43 leaks into the barrier chamber 30 as a result of damage or excessive wear of the mechanical seal 20, the volatile liquid flows through a minute gap formed between the inner peripheral surface of the floating seal 97 and the outer peripheral surface of the shaft sleeve 38. At this time, the pressure of the volatile liquid decreases while the temperature of the volatile liquid rises. As a result, at least a part of the volatile liquid is vaporized. The vaporized volatile fluid is less likely to damage the mechanical seal 20 than the volatile liquid. Therefore, the floating seal 97 can minimize the damage of the mechanical seal 20 when the volatile fluid leaks. In one embodiment, the pump-side non-contact seal arranged in the pump-side seal chamber 43 may be a labyrinth seal, instead of the floating seal 97.

Figure 6:
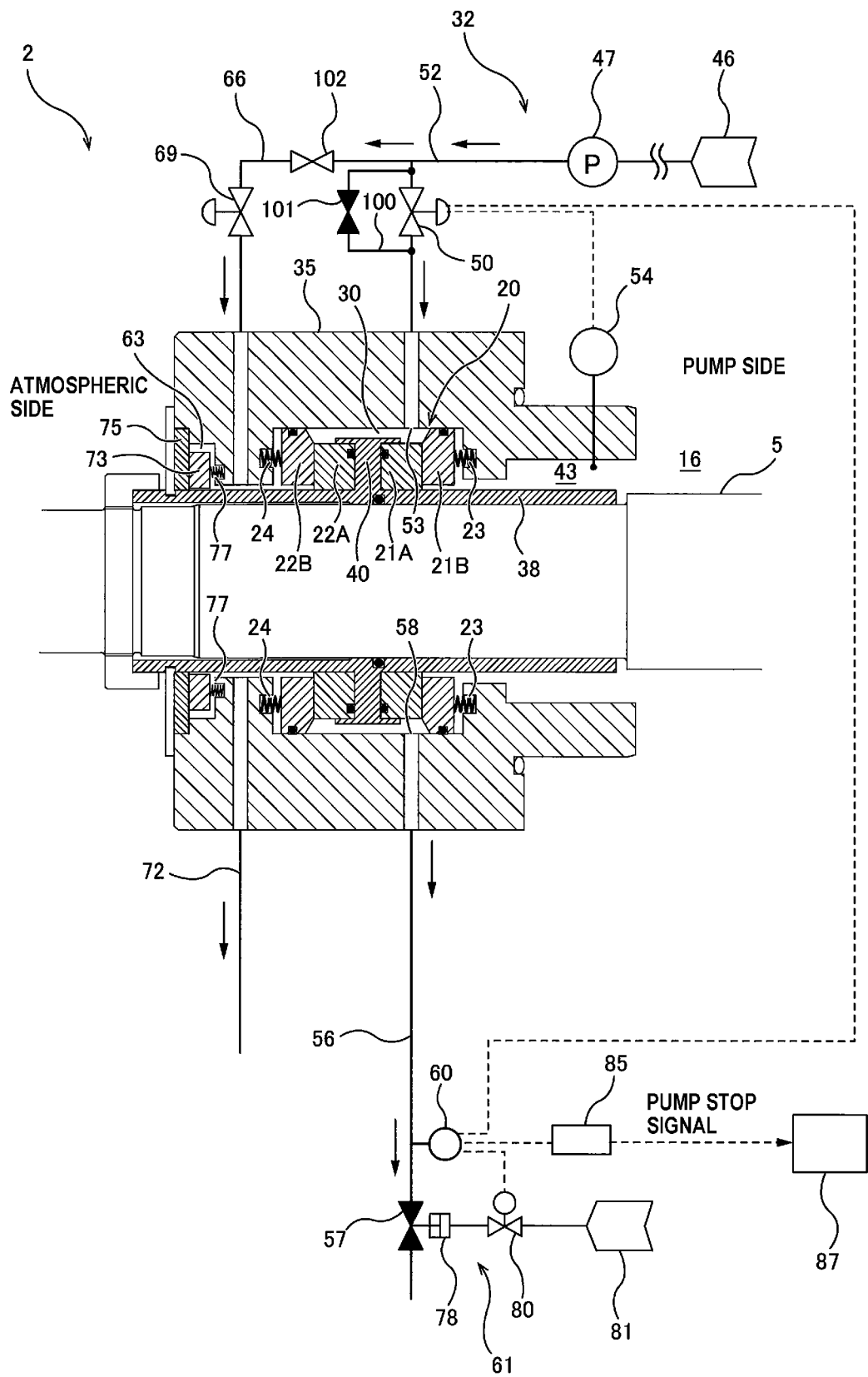
FIG. 6 is a diagram showing another embodiment of the sealing system.

FIG. 6 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 further includes a bypass line 100 that bypasses the pressure control valve 50, a bypass valve 101 attached to the bypass line 100, and an on-off valve 102 attached to the barrier-gas inflow line 66. One end of the bypass line 100 is coupled to the barrier-gas supply line 52 at a position upstream of the pressure control valve 50, and the other end of the bypass line 100 is coupled to the barrier-gas supply line 52 at a position downstream of the pressure control valve 50.

The bypass valve 101 and the on-off valve 102 are manual valves. During normal operation, the on-off valve 102 is in an open state, while the bypass valve 101 is in a closed state. When the volatile liquid leaks into the barrier chamber 30 as a result of damage of the mechanical seal 20 and it becomes necessary to disassemble the mechanical seal 20, the on-off valve 102 is closed and the bypass valve 101 is opened. The barrier gas flows through the bypass line 100, instead of the barrier-gas inflow line 66, into the barrier-gas supply line 52, so that the barrier gas is supplied into the barrier chamber 30. According to the present embodiment, since a larger amount of the barrier gas is supplied to the barrier chamber 30, the volatile fluid that has leaked into the barrier chamber 30 is likely to flow out through the relief line 56.

Figure 7:
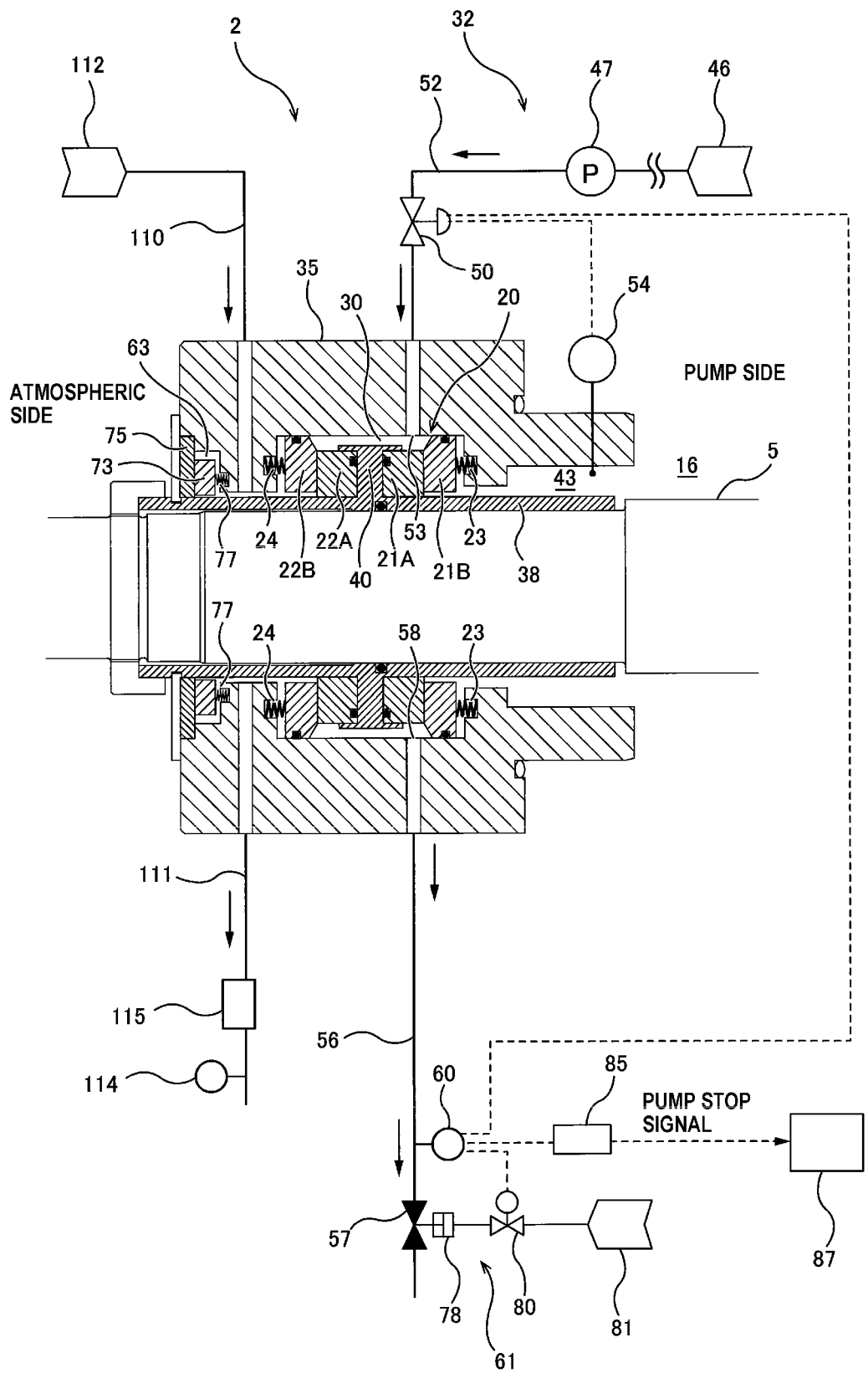
FIG. 7 is a diagram showing another embodiment of the sealing system.

FIG. 7 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 includes, instead of the barrier-gas inflow line 66, a solvent-solution supply line 110 that supplies a solvent solution to the atmospheric-side seal chamber 63. The sealing system 2 further includes, instead of the barrier-gas recovery line 72, a solvent-solution recovery line 111 for recovering the solvent solution that has supplied to the atmospheric-side seal chamber 63.

One end of the solvent-solution supply line 110 is coupled to a solvent-solution supply source 112, and the other end of the solvent-solution supply line 110 communicates with the atmospheric-side seal chamber 63. One end of the solvent-solution recovery line 111 communicates with the atmospheric-side seal chamber 63. Examples of the solvent solution include water and an aqueous solution. The solvent solution is supplied from the solvent-solution supply line 110 into the atmospheric-side seal chamber 63, and is discharged from the atmospheric-side seal chamber 63 through the solvent-solution recovery line 111. The atmospheric-side non-contact seal arranged in the atmospheric-side seal chamber 63 is the floating seal 73 that can reliably prevent the solvent solution from leaking to the atmospheric side.

Some of volatile liquids are more likely to be dissolved in a liquid (or a solvent) than being vaporized. Ammonia is a typical example. In a case where the volatile liquid is ammonia, water (or an aqueous solution) is supplied as the solvent for ammonia from the solvent-solution supply line 110 into the atmospheric-side seal chamber 63 during the normal operation, so that the ammonia is dissolved in the water before the ammonia is vaporized. Therefore, the sealing system can reliably prevent vaporization of the ammonia and diffusion of the ammonia into the atmosphere.

Ammonia generates heat when dissolved in water, and the water becomes turbid. Therefore, in order to check a degree of leakage of ammonia, a solvent-solution temperature sensor 114 for measuring the temperature of the solvent solution and a flow site 115 for observing the degree of turbidity of the solvent solution are attached to the solvent-solution recovery line 111. In a case where the environment in which the pump 1 is installed is a cold region below freezing point, a solvent solution that does not freeze is required. Therefore, it is preferable to use an antifreeze solution, particularly a glycerin aqueous solution, as the solvent solution.

Figure 8:
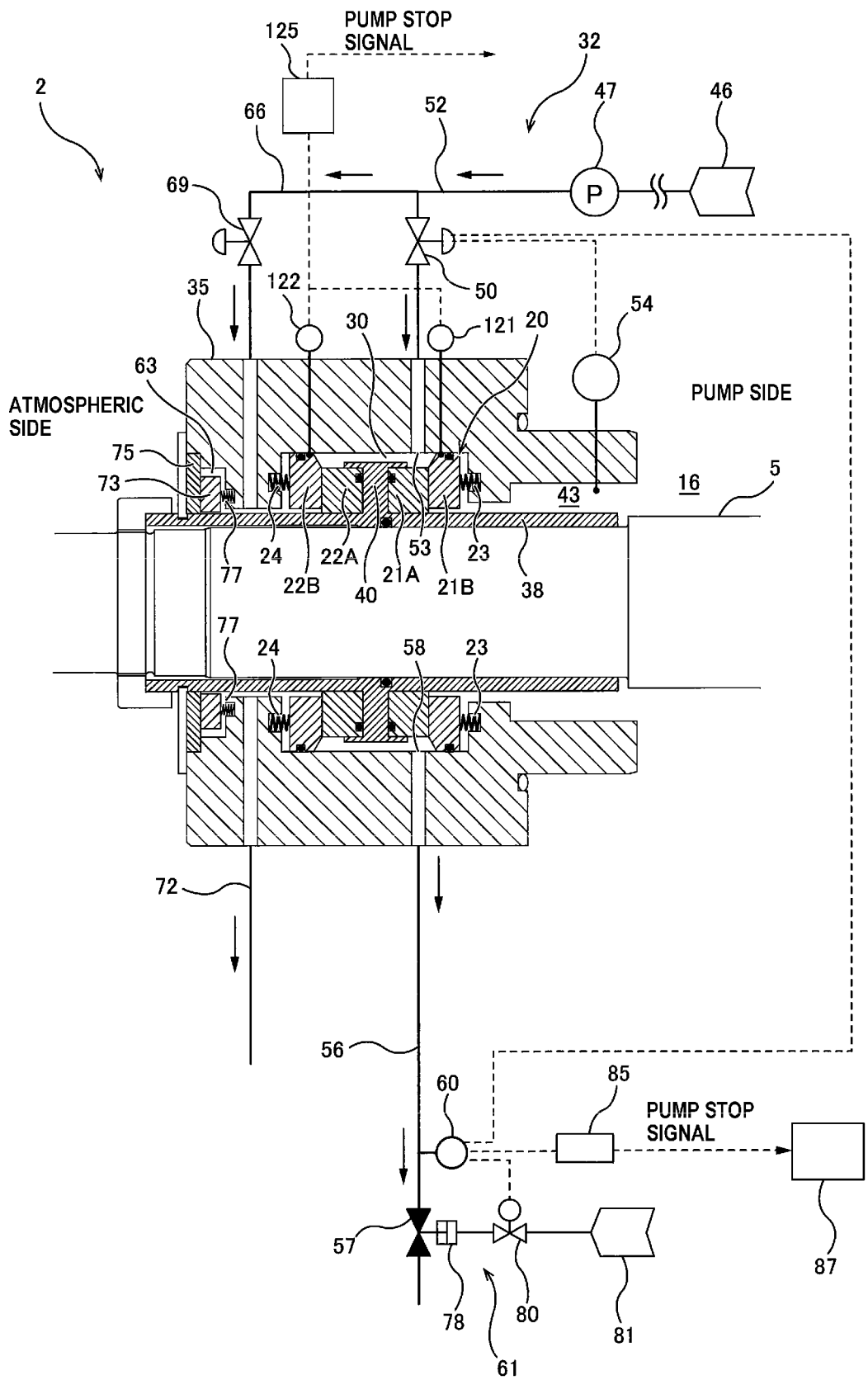
FIG. 8 is a diagram showing another embodiment of the sealing system.

FIG. 8 is a diagram showing another embodiment of the sealing system 2. Configurations and operations of this embodiment, which will not be described particularly, are the same as those of the embodiment described with reference to FIGS. 1 and 2, and repetitive descriptions thereof will be omitted. In this embodiment, the sealing system 2 includes a first temperature sensor 121 for measuring the temperature of the first stationary-side seal ring 21B and a second temperature sensor 122 for measuring the temperature of the second stationary-side seal ring 22B.

The sealing surfaces of the seal rings 21A and 21B and the sealing surfaces of the seal rings 22A and 22B are in contact with the barrier gas during stable operation. However, when the volatile liquid leaks into the barrier chamber 30, a part of the volatile liquid is vaporized on the sealing surfaces due to the frictional heat of the sealing surfaces. As a result, the pressure rises locally on the sealing surfaces, and a sealing-surface pressure becomes unstable. Furthermore, a frictional resistance of the sealing surfaces differs between a wet environment and a dry environment. Therefore, it is assumed that the sliding state of the sealing surfaces becomes unstable. Such state appears as a change in the temperature of the stationary-side seal rings 21B and 22B.

Thus, the sealing system 2 of the present embodiment includes the first temperature sensor 121 and the second temperature sensor 122 configured to measure the temperatures of the stationary-side seal rings 21B and 22B of the mechanical seal 20, respectively. The first temperature sensor 121 and the second temperature sensor 122 are electrically coupled to a signal transmitter 125, and are configured to transmit measured values of the temperatures of the stationary-side seal rings 21B and 22B to the signal transmitter 125. The signal transmitter 125 is configured to emit a pump stop signal when the measured value of the temperature of the stationary-side seal ring 21B or the measured value of the temperature of the stationary-side seal ring 22B exceeds a threshold value. The pump stop signal is transmitted to the operation controller 87, and the operation controller 87 receives the pump stop signal and stops the prime mover of the pump 1. As a result, the operation of the pump 1 is stopped, so that the spread of leakage of the volatile liquid can be prevented. The signal transmitter 125 and the signal transmitter 85 of the above-described embodiments may be composed of one signal transmitter.

The above-described embodiments can be combined as appropriate. For example, the labyrinth seal 95 shown in FIG. 4 and the floating seal 97 shown in FIG. 5 can be combined with the embodiments shown in FIGS. 3, 6, 7, and 8. Further, the labyrinth seal 95 shown in FIG. 4 can be combined with the embodiment shown in FIG. 5.

The pump 1 shown in each of the above-described embodiments is a multistage pump having a plurality of impellers, but the present invention is not limited to the above-described embodiments. The present invention can also be applied to a double-suction single-stage pump and a single-suction single-stage pump.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a sealing system for a pump configured to pressurize a volatile liquid, such as liquid ammonia.

REFERENCE SIGNS LIST 1 pump
2 sealing system
5 rotating shaft
7 impeller
8 casing
8A suction port
8B discharge port
10 radial bearing
11 thrust bearing
15 balance mechanism
16 balance chamber
17 balance line
20 mechanical seal
21A first rotating-side seal ring
21B first stationary-side seal ring
22A second rotating-side seal ring
22B second stationary-side seal ring
23 first spring
24 second spring
30 barrier chamber
32 barrier-gas supply system
35 stuffing box
38 shaft sleeve
40 seal-ring holder
43 pump-side seal chamber
46 barrier-gas supply source
47 compressor
50 pressure-control valve
52 barrier-gas supply line
53 barrier-gas supply opening
54 liquid pressure sensor
56 relief line
57 pressure relief valve
58 fluid inlet
60 gas pressure sensor
61 valve actuator
63 atmospheric-side seal chamber
66 barrier-gas inflow line
69 pressure-control valve
72 barrier-gas recovery line
73 floating seal
75 retaining ring
77 spring
77 air cylinder
78 working-fluid supply valve
80 working-fluid supply source
81 signal transmitter
87 operation controller
88 pressure accumulator
88a diaphragm
90 drain pot
91 liquid level detector
95 labyrinth seal
97 floating seal 98 spring
100 bypass line
101 bypass valve
102 on-off valve
110 solvent-solution supply line
111 solvent-solution recovery line
112 solvent-solution supply source
114 solvent-solution temperature sensor
115 flow site
121 first temperature sensor
122 second temperature sensor
125 signal transmitter

The invention claimed is:

1. A sealing system for a pump configured to pressurize a volatile liquid, comprising:
    a stuffing box that forms a barrier chamber and a pump-side seal chamber;
    a mechanical seal located in the barrier chamber;
    a barrier-gas supply system configured to supply a barrier gas into the barrier chamber, the barrier gas having a pressure higher than a pressure of the volatile liquid in the pump-side seal chamber;
    a relief line coupled to the barrier chamber;
    a pressure relief valve attached to the relief line; and
    a valve actuator configured to open the pressure relief valve when a pressure in the relief line is out of a preset pressure range,
    wherein the pump-side seal chamber is located between an impeller of the pump and
    the mechanical seal, and
    the barrier-gas supply system includes a pressure control valve configured to maintain a constant difference between the pressure in the barrier chamber and the pressure in the pump-side seal chamber.

2. The sealing system according to claim 1, further comprising a signal transmitter configured to emit a pump stop signal when the pressure in the relief line is out of the pressure range.

3. The sealing system according to claim 1, further comprising a pressure accumulator coupled to the relief line.

4. The sealing system according to claim 1 further comprising:
    a drain pot coupled to the relief line; and
    a liquid level detector configured to detect a liquid level in the drain pot.

5. The sealing system according to claim 1, wherein:
    the stuffing box further forms an atmospheric-side seal chamber located at an atmospheric side of the mechanical seal;
    the sealing system further comprises an atmospheric-side non-contact seal, a barrier gas inflow line, and a barrier-gas recovery line;
    the atmospheric-side non-contact seal is located in the atmospheric-side seal chamber;
    the barrier-gas inflow line and the barrier-gas recovery line are in communication with the atmospheric-side seal chamber; and
    the barrier-gas inflow line is coupled to the barrier-gas supply system.

6. The sealing system according to claim 5, wherein the atmospheric-side non-contact seal is a floating seal or a labyrinth seal surrounding a rotating shaft of the pump.

7. The sealing system according to claim 1, wherein:
    the stuffing box further forms an atmospheric-side seal chamber located at an atmospheric side of the mechanical seal;
    the sealing system further comprises an atmospheric-side non-contact seal, a solvent solution supply line, and a solvent-solution recovery line;
    the atmospheric-side non-contact seal is located in the atmospheric-side seal chamber; and
    the solvent-solution supply line and the solvent-solution recovery line are in communication with the atmospheric-side seal chamber.

8. The sealing system according to claim 7, wherein the atmospheric-side non-contact seal is a floating seal or a labyrinth seal surrounding a rotating shaft of the pump.

9. The sealing system according to claim 1, further comprising an interior non-contact seal provided in the barrier chamber.

10. The sealing system according to claim 9, wherein the interior non-contact seal is a labyrinth seal.

11. The sealing system according to claim 9, wherein the barrier-gas supply system has a barrier-gas supply opening facing the barrier chamber, and the interior non-contact seal is located at the atmospheric side of the barrier-gas supply opening.

12. The sealing system according to claim 1, further comprising a pump-side non-contact seal arranged in the pump-side seal chamber.

13. The sealing system of claim 12, wherein the pump-side non-contact seal is a floating seal or labyrinth seal that surrounds rotating shaft of the pump.

14. The sealing system according to claim 1, wherein the mechanical seal is a double mechanical seal including a first rotating-side seal ring and a first stationary-side seal ring which are in contact with each other, and further including a second rotating-side seal ring and a second stationary-side seal ring which are in contact with each other.

15. The sealing system according to claim 14, further comprising:
    a first temperature sensor configured to measure a temperature of the first stationary side seal ring; and
    a second temperature sensor configured to measure a temperature of the second stationary-side seal ring.

16. A pump system for pressurizing a volatile liquid, comprising:
    a rotating shaft;
    an impeller fixed to the rotating shaft;
    a casing in which the impeller is disposed;
    a stuffing box that forms a barrier chamber and a pump-side seal chamber;
    a mechanical seal located in the barrier chamber;
    a barrier-gas supply system configured to supply a barrier gas into the barrier chamber, the barrier gas having a pressure higher than a pressure of the volatile liquid in the pump-side seal chamber;
    a relief line coupled to the barrier chamber;
    a pressure relief valve attached to the relief line; and
    a valve actuator configured to open the pressure relief valve when a pressure in the relief line is out of a preset pressure range,
    wherein the pump-side seal chamber is located between the impeller and the mechanical seal, and
    the barrier-gas supply system includes a pressure control valve configured to maintain a constant difference between the pressure in the barrier chamber and the pressure in the pump-side seal chamber.

17. The pump system according to claim 16, further comprising a signal transmitter configured to emit a pump stop signal when the pressure in the relief line is out of the pressure range.

18. The pump system according to claim 16, further comprising a pressure accumulator coupled to the relief line.

19. The pump system according to claim 16, further comprising:
   a drain pot coupled to the relief line; and
   a liquid level detector configured to detect a liquid level in the drain pot.

20. The pump system according to claim 16, wherein:
   the stuffing box further forms an atmospheric-side seal chamber located at an atmospheric side of the mechanical seal;
   the pump system further comprises an atmospheric-side non-contact seal, a barrier gas inflow line, and a barrier-gas recovery line;
   the atmospheric-side non-contact seal is located in the atmospheric-side seal chamber;
   the barrier-gas inflow line and the barrier-gas recovery line are in communication with the atmospheric-side seal chamber; and
   the barrier-gas inflow line is coupled to the barrier-gas supply system.

21. The pump system of claim 20, wherein the atmospheric-side non-contact seal is a floating seal or a labyrinth seal surrounding the rotating shaft.

22. The pump system according to claim 16, wherein:
   the stuffing box further forms an atmospheric-side seal chamber located at an atmospheric side of the mechanical seal;
   the sealing system further comprises an atmospheric-side non-contact seal, a solvent solution supply line, and a solvent-solution recovery line;
   the atmospheric-side non-contact seal is located in the atmospheric-side seal chamber; and
   the solvent-solution supply line and the solvent-solution recovery line are in communication with the atmospheric-side seal chamber.

23. The pump system according to claim 22, wherein the atmospheric-side non-contact seal is a floating seal surrounding the rotating shaft.

24. The pump system according to claim 16, further comprising an interior non-contact seal provided in the barrier chamber.

25. The pump system according to claim 24, wherein the interior non-contact seal is a labyrinth seal.

26. The pump system according to claim 24, wherein the barrier-gas supply system has a barrier-gas supply opening facing the barrier chamber, and the interior non-contact seal is located at the atmospheric side of the barrier-gas supply opening.

27. The pump system according to claim 16, further comprising a pump-side non-contact seal arranged in the pump-side seal chamber.

28. The pump system of claim 27, wherein the pump-side non-contact seal is a floating seal or labyrinth seal that surrounds the rotating shaft.

29. The pump system according to claim 16, wherein the mechanical seal is a double mechanical seal including a first rotating-side seal ring and a first stationary-side seal ring which are in contact with each other, and further including a second rotating-side seal ring and a second stationary-side seal ring which are in contact with each other.

30. The pump system according to claim 29, further comprising:
   a first temperature sensor configured to measure a temperature of the first stationary side seal ring; and
   a second temperature sensor configured to measure a temperature of the second stationary-side seal ring.

* * * * *